(12) United States Patent
Korten et al.

(10) Patent No.: US 10,617,495 B2
(45) Date of Patent: Apr. 14, 2020

(54) DENTAL MILLING BLOCK CONTAINING INDIVIDUALIZED DENTAL ARTICLE AND PROCESS OF PRODUCTION

(71) Applicant: 3M INNOVATIVE PROPERTIES COMPANY, Saint Paul, MN (US)

(72) Inventors: Malte Korten, Gröbenzell (DE); Helmar Mayr, Kaufering (DE); Gallus Schechner, Herrsching (DE); Christoph Thalacker, Weilheim (DE); Karsten Dede, Landsberg (DE); Michael Jahns, Gilching (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 900 days.

(21) Appl. No.: 14/377,194

(22) PCT Filed: Dec. 7, 2012

(86) PCT No.: PCT/US2012/068388
§ 371 (c)(1),
(2) Date: Aug. 7, 2014

(87) PCT Pub. No.: WO2013/122662
PCT Pub. Date: Aug. 22, 2013

(65) Prior Publication Data
US 2014/0377718 A1 Dec. 25, 2014

(30) Foreign Application Priority Data
Feb. 13, 2012 (EP) ..................................... 12155101

(51) Int. Cl.
*A61C 5/00* (2017.01)
*A61C 13/20* (2006.01)
(Continued)

(52) U.S. Cl.
CPC ................. *A61C 13/20* (2013.01); *A61C 5/77* (2017.02); *A61C 13/0022* (2013.01); *Y10T 29/49567* (2015.01)

(58) Field of Classification Search
CPC ......... A61C 5/08; A61C 5/10; A61C 13/0004; A61C 13/0006; A61C 13/0022; A61C 13/20; A61C 5/77
(Continued)

(56) References Cited

U.S. PATENT DOCUMENTS

| 4,937,928 A | 7/1990 | Van |
| 5,151,044 A | 9/1992 | Rotsaert |

(Continued)

FOREIGN PATENT DOCUMENTS

| EP | 0455854 | 11/1991 |
| EP | 0850601 | 7/1998 |

(Continued)

OTHER PUBLICATIONS

EP Application No. 11195192.7 filed Dec. 22, 2011.
International Search Report for PCT Application No. PCT/US2012/068388 dated Mar. 19, 2013, 5 pages.

*Primary Examiner* — Nicholas D Lucchesi
(74) *Attorney, Agent, or Firm* — 3M Innovative Properties Compa

(57) ABSTRACT

The invention relates to a dental milling block (1) comprising a dental article (2) having an outer surface, the dental article having been produced based on personalized data, wherein the outer surface of the dental article is at least partially covered with a surrounding material. The invention further relates to a process of producing a dental milling block, the process comprising the steps of: •a) providing a personalized Data Set C containing geometry data of the dental article and colour data related to said geometry data, •b) generating a layer of hardenable material on a surface,
(Continued)

•c) applying a colour agent to the layer of hardenable material of step b), wherein the colour agent is applied to at least some regions of those areas of the layer of hardenable material which are related to the geometry data of the dental article, •d) consolidating the result obtained in step c) thereby obtaining an at least partially hardened layer of material.

8 Claims, 2 Drawing Sheets

(51) Int. Cl.
  *A61C 13/00* (2006.01)
  *A61C 5/77* (2017.01)
(58) Field of Classification Search
  USPC ........ 433/202.1, 203.1, 223; 264/16, 19, 20, 264/113, 400, 482
  See application file for complete search history.

(56) References Cited

U.S. PATENT DOCUMENTS

| | | | | |
|---|---|---|---|---|
| 5,219,805 A * | 6/1993 | Yoshida | ............... | A61C 7/00 501/103 |
| 5,347,454 A * | 9/1994 | Mushabac | ......... | A61C 13/0004 433/214 |
| 5,759,030 A | 6/1998 | Jung | | |
| 5,768,134 A * | 6/1998 | Swaelens | ........... | A61C 13/0004 433/201.1 |
| 5,823,778 A * | 10/1998 | Schmitt | ................. | A61C 9/00 433/214 |
| 5,902,441 A | 5/1999 | Bredt | | |
| 6,322,728 B1 * | 11/2001 | Brodkin | ............. | A61C 13/0003 264/113 |
| 6,713,421 B1 * | 3/2004 | Hauptmann | ......... | C04B 35/486 433/202.1 |
| 6,769,912 B2 | 8/2004 | Beuschel | | |
| 6,808,659 B2 * | 10/2004 | Schulman | .......... | A61C 13/0003 264/113 |
| 6,955,776 B1 * | 10/2005 | Feenstra | ............ | A61C 13/0004 264/112 |
| 6,994,549 B2 | 2/2006 | Brodkin | | |
| 7,086,863 B2 | 8/2006 | Van | | |
| 7,686,989 B2 | 3/2010 | Van | | |
| 7,871,268 B2 * | 1/2011 | Touchstone | ........ | A61C 13/0004 433/203.1 |
| 7,981,531 B2 | 7/2011 | Rheinberger | | |
| 8,483,857 B2 * | 7/2013 | Orth | .................. | A61C 13/0004 700/118 |
| 8,813,364 B2 * | 8/2014 | Schechner | ......... | A61C 13/0004 264/16 |
| 8,893,387 B2 * | 11/2014 | Basler | ................ | A61C 13/0003 29/557 |
| 9,827,104 B2 * | 11/2017 | Miquel | ............... | A61F 2/30942 |
| 10,076,388 B2 * | 9/2018 | Saliger | ................... | A61C 9/004 |
| 2002/0013380 A1 * | 1/2002 | Chappelow | .......... | C07D 493/10 522/14 |
| 2002/0076530 A1 * | 6/2002 | MacDougald | ..... | A61C 13/0003 428/195.1 |
| 2003/0132539 A1 | 7/2003 | Althoff | | |
| 2005/0023710 A1 * | 2/2005 | Brodkin | ............... | A61C 13/003 264/16 |
| 2006/0008777 A1 | 1/2006 | Peterson | | |
| 2010/0233655 A1 * | 9/2010 | Karim | ................. | A61C 13/0009 433/172 |
| 2010/0244294 A1 | 9/2010 | Karim | | |
| 2010/0285429 A1 * | 11/2010 | Karim | ................. | A61C 13/0022 433/199.1 |
| 2010/0310786 A1 | 12/2010 | Dunne | | |
| 2011/0104643 A1 * | 5/2011 | Giordano | ........... | A61C 13/0022 433/203.1 |
| 2011/0125304 A1 * | 5/2011 | Schneider | .......... | A61C 13/0004 700/98 |
| 2011/0244429 A1 * | 10/2011 | Waizenegger | ........... | A61C 5/10 433/203.1 |
| 2011/0256507 A1 * | 10/2011 | Chiu | .................. | A61C 13/0004 433/203.1 |
| 2012/0052186 A1 | 3/2012 | Junglas | | |
| 2012/0139142 A1 * | 6/2012 | Van Der Zel | ...... | A61C 13/0004 264/20 |
| 2012/0175801 A1 * | 7/2012 | Jahns | ................. | A61C 13/0003 264/19 |
| 2013/0316306 A1 * | 11/2013 | Carden | ............. | A61C 13/0004 433/203.1 |
| 2014/0106308 A1 * | 4/2014 | Thiel | .................. | A61C 13/0022 433/203.1 |
| 2014/0255875 A1 * | 9/2014 | Saliger | ..................... | A61C 5/08 433/203.1 |
| 2016/0242881 A1 * | 8/2016 | Fisker | ................ | A61C 13/0022 |
| 2017/0231731 A1 * | 8/2017 | Korten | .............. | A61C 13/0004 433/203.1 |

FOREIGN PATENT DOCUMENTS

| | | |
|---|---|---|
| EP | 1252867 | 10/2002 |
| EP | 1561433 | 8/2005 |
| EP | 2422739 | 2/2012 |
| WO | WO 2010-110650 | 9/2010 |
| WO | WO 2010-110662 | 9/2010 |
| WO | WO 2012-036852 | 3/2012 |
| WO | WO 2013-095968 | 6/2013 |

* cited by examiner

DENTAL MILLING BLOCK CONTAINING INDIVIDUALIZED DENTAL ARTICLE AND PROCESS OF PRODUCTION

CROSS REFERENCE TO RELATED APPLICATIONS

This application is a national stage filing under 35 U.S.C. 371 of PCT/US2012/068388, filed Dec. 7, 2012, which claims priority to European Application No. 12155101.4, filed Feb. 13, 2012, the disclosures of which are incorporated by reference in their entirety herein.

FIELD OF THE INVENTION

The invention relates to a dental milling block comprising an individualized dental article and to a process of producing a dental milling block containing an individualized dental article, a mill block obtainable from this process and a process of producing a dental article using the milling block.

BACKGROUND ART

Mill blocks are typically polygonal, in many cases cylindric or cuboid moulded specimen. They can be prepared by filling a curable formulation into a mould and subsequent curing of the material to give specimen of sufficient mechanical strength for milling or grinding. The cured specimen can optionally be cut into the desired shape and are often fixed on a sample holder for use in milling machines. Radical curing of such materials is often accompanied with undesirable high shrinkage of the specimen. As a result, those materials have high internal stress, which is often relieved by cracking of the specimen or by fraction or chipping during milling or during the usage in the oral cavity.

Composite miling blocks (CMBs) can also be used in prosthetic dentistry. Todays milling blocks in terms of curing chemistry are often based on (meth)acrylate technology. That means the polymerizable resins used in the formulation comprise esters of acrylic and/or methacrylic acid. CMBs are obtained by curing such formulations radically either by radiation activated generation of radicals or by thermal or redox generation of radicals. CMBs are often used for the production of e.g. crowns, inlays, onlays or partial crowns. To obtain these, CMBs are milled in computer controlled milling/grinding machines.

U.S. Pat. No. 4,937,928 (van der Zel) describes a method of making a dental crown by means of a CAD-CAM system, wherein under the control of the CAD-CAM system a model of the dental preparation is made from a certain material, to which model successively two or more layers of another suitable material are applied.

U.S. Pat. No. 7,086,863 B2 (van der Zel) relates to a method of producing an artifical tooth comprising a base layer and a cover layer. The method comprises a variety of steps including the steps of constructing the base layer and applying a cover layer over the base layer.

WO 2010/110662 A2 (Voit et al.) describes a method for manufacturing a dental restoration comprising a dental restoration core and a veneer layer, comprising: providing the material of the dental restoration core with a base colour, providing the constituent material of the veneer layer with a surface colour, the constituent material of the veneer layer being translucent below an optical thickness.

U.S. Pat. No. 5,151,044 (Rotsaert) relates to a blank for the manufacture of artificial teeth and crowns, which comprises a layered block of synthetic plastics materials, the layers being of predetermined varying colour, chroma, value and translucency.

U.S. Pat. No. 6,994,549 (Brodkin et al.) describes the use of solid free form fabrication techniques for creating dental restorations.

U.S. Pat. No. 7,981,531 (Rheinberger et al.) describes a multi-coloured shaped body having layers arranged on top of one another for producing dental restorations.

US 2010/0244294 A1 (Karim et al.) relates to a dental article as a crown being fabricated by layering one or more preformed shells of SMC material onto an understructure.

EP 1 561 433 A1 (Cadent Ltd.) describes a method and system for manufacturing a dental prosthesis. Dimensional data of at least one critical parameter of the workpiece from which the crown is to be manufactured is determined and compared with corresponding target dimensional data of the desired prosthesis.

US 2010/0310786 A1 (Dunne) relates to systems and methods employing various modes of material deposition and material removal to build a complex, three-dimensional structure upon a rotating base.

EP 0 850 601 B1 describes a semi-finished dental part wherein the moulding is constructed from the core and at least one layer with different optical properties.

These systems often possess limitations regarding productivity, aesthetics or precision.

Thus, there is still a need for improvement, especially with respect to processes and milling blocks which can be used for producing dental restorations.

SUMMARY OF THE INVENTION

It is an object of the invention to provide a dental milling block which allows an easy and streamlined production of an individualized dental article.

In addition to this object or alternatively to this object, it would be desirable to reduce the risk of fractures during the production or shipment of a dental article.

According to one embodiment the invention provides a dental milling block comprising a dental article having an outer surface, the dental article having been produced or being based on personalized data, wherein the outer surface of the dental article is at least partially surrounded or covered with a surrounding material, wherein the personalized data preferably comprises colour data. The dental milling block has typically a geometrically defined shape.

According to a further embodiment the invention provides a process of producing a dental milling block as described in the present text, the process comprising the steps of:
  a) providing a personalized Data Set C containing geometry data of the dental article and colour data related to said geometry data,
  b) generating a layer of hardenable material on a surface,
  c) applying a colour agent to the layer of hardenable material of step b), wherein the colour agent is applied to at least some regions of those areas of the layer of hardenable material which are related to the geometry data of the dental article,
  d) consolidating the result obtained in step c) thereby obtaining an at least partially hardened layer of material.

A further embodiment of the invention is related to a dental milling block obtainable or obtained by the process described in the present text.

Still a further embodiment of the invention is related to a process of producing a dental article comprising the steps:
a) provide a dental milling block as described in the present text,
b) machine the dental milling block using at least parts of the geometry data contained in Data Set C.

The invention is also related to a dental article obtainable or obtained by the processes described in the present text.

Other embodiments, features and advantages of the present invention will be apparent from the following detailed description, drawings, and claims.

FIGURES

Figure 1:
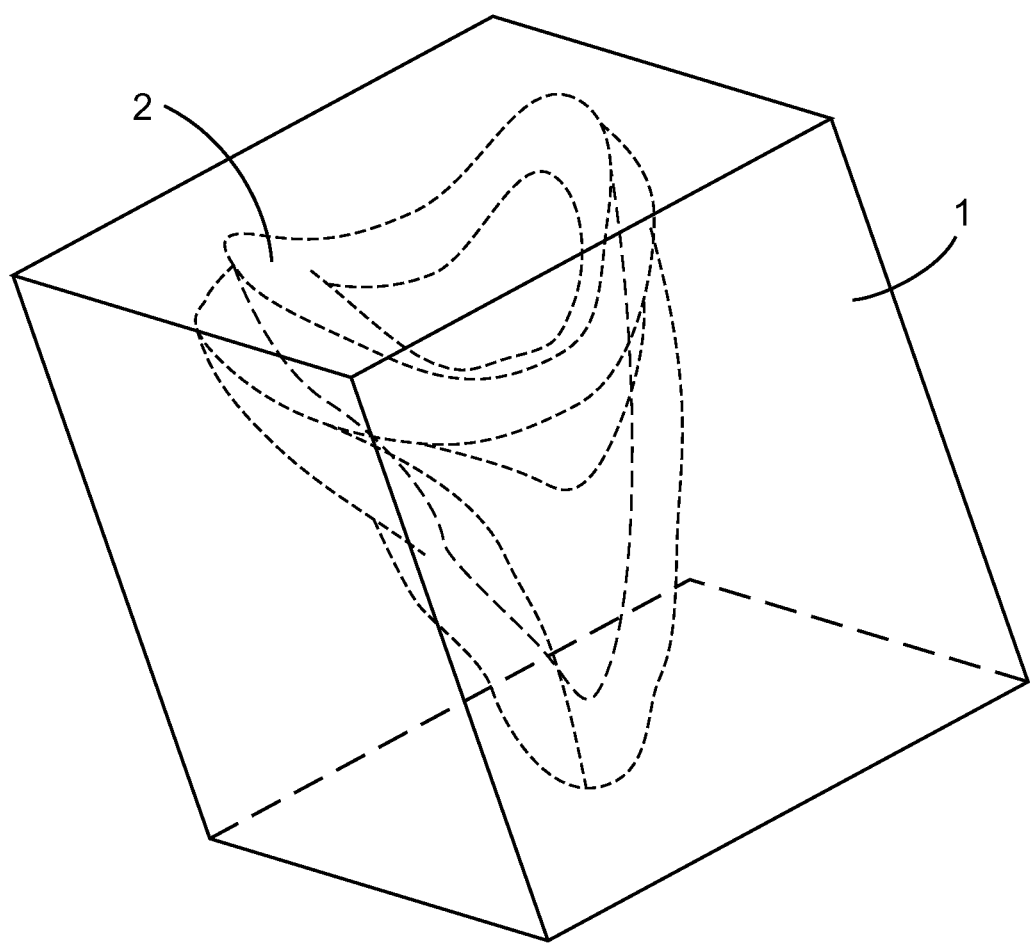
FIG. 1 is a transparent view of a cube shaped dental milling block containing a dental article and an individualized dental article.

Unless defined differently, for this description the following terms shall have the given meaning:

The term "dental article" means any article which can and is to be used in the dental field, especially as dental restoration(s) and part(s) thereof. Dental restorations often comprise at least two parts: a dental support structure (sometimes also referred to as frame or coping) and a dental facing. There are, however, also dental articles which basically only comprise one part. This kind of dental restauration is often referred to as monolithic restoration.

Examples of dental articles include crown(s), bridge(s), veneer(s), implant(s), abutment(s), root-pin(s), orthodontic bracket(s), dental support structure(s), inlay(s), onlay(s), drilling template(s), full arch prosthesis and parts thereof.

The material a dental article is made of should not be detrimental to the patient's health and thus free of hazardous and toxic components being able to migrate out of the article. Dental articles are typically of small size and may comprise sections having a wall thickness in the range of about 100 µm to 2,000 µm or in the range of about 100 µm to about 500 µm. The total volume of a dental article is typically below about 100 ml or below about 50 ml or below about 10 ml or below about 5 ml.

A "support structure" is to be understood as a structure being suitable to support or stabilize another article.

A "dental support structure" is to be understood as the part of a dental restoration which is typically adhered to a tooth stump or inserted into the patients mouth and suitable for being veneered by a dental facing or dental veneer. A dental support structure has typically sufficient strength to withstand chewing forces.

Dental support structures are often made of or comprise oxide ceramic materials including $ZrO_2$, and $Al_2O_3$, metals or alloys. Compared to other framework such as pottery or paving stones, the dental framework is small and filigree and of high strength. The thickness of the dental framework can vary from very thin, e.g. at the edges and rims (below about 0.1 mm) to considerably thick, e.g. in the biting area (up to about 7 mm). However, dental frameworks may also be made of or comprise metal or metal alloys.

The term "dental facing" or "dental veneer" refers to the aesthetic part of a dental restoration, meaning the part comprising an outer surface of the finished restoration. The dental facing is further adapted to be applied to a frame or dental support structure which forms another part of the dental restoration, and the dental restoration is in turn applied to a tooth. The dental facing is preferably arranged at those parts of the dental support structure that are likely to be visible in a patient's mouth, or that in particular functionally co-operate with the adjacent or opposed teeth of a patient, for example.

Dental veneers are also small and filigree objects. The strength of dental veneers, however, is typically lower compared to dental frameworks. Dental veneers are typically made of or comprise glass or glass ceramic materials.

A dental support structure or a dental veneer usually has a 3-dimensional inner and outer surface including convex and concave structures. The outer surface of the dental framework typically corresponds essentially to the inner surface of the dental veneer. The inner surface of the dental framework typically corresponds essentially to the outer surface of a prepared tooth stump, whereas the outer surface of the dental veneer typically corresponds essentially to the final dental restoration.

By "monolithic restorations" is meant a dental article which is essentially made of only one material, typically a zirconia, lithium disilicate, composite or temporary material. The material for a monolithic restoration should not be detrimental to the patient health. E.g., a monolithic restoration should not cause severe abrasion of the antagonist tooth in the mouth of a patient. A monolithic restauration is typically designed as a full contour restoration, that means the inner contour fits on a tooth stump, the outer shape resembles the contour of the natural tooth.

By "dental milling block" is meant a solid block (3-dim article) of material from which a dental article can be machined. A dental milling block has typically a geometrically defined shape. A dental milling block may have a size of about 20 mm to about 30 mm in two dimensions, for example may have a diameter in that range, and may be of a certain length in a third dimension. A block or blank for making a single crown may have a length of about 15 mm to about 30 mm, and a block or blank for making bridges may have a length of about 40 mm to about 80 mm. A typical size of a block or blank as it is used for making a single crown has a diameter of about 24 mm and a length of about 19 mm. Further, a typical size of a block or blank as it is used for making bridges has a diameter of about 24 mm and a length of about 58 mm. Besides the above mentioned dimensions, a dental milling block may also have the shape of a cube, a cylinder or a cuboid. Larger milling blocks may be advantageous if more than one crown or bridge should be manufactured out of one blank. For these cases, the diameter or length of a cylindric or cuboid shaped mill blank may be in a range of about 80 to about 200 mm, with a thickness being in the range of about 10 to about 30 mm.

Rapid-prototyping techniques may include ink-jet printing, 3d-printing, multijet plotting, robo-casting, electrophoretic deposition, fused deposition modelling, laminated object manufacturing, selective laser sintering or melting, stereolithography, photostereolithography, or combinations thereof.

Those and other techniques are e.g. described in U.S. Pat. No. 5,902,441 (Bredt et al), U.S. Pat. No. 6,322,728 (Brodkin et al), U.S. Pat. No. 6,955,776 (Feenstra) and U.S. Pat. No. 7,086,863 (Van der Zel).

The disclosure of these patents as it regards the description of rapid-prototyping techniques is herewith incorporated by reference and regarded as part of this application.

Commercially available examples of rapid-prototyping equipment which can be used include printers from the company ZCorp like the printer ZPrinter™ 310 plus.

A "hardenable material" is any material which can be cured, polymerized or solidified including chemical cross-linking through radiation-induced polymerization, cross-linking by using an initiator or heating, either partially or fully. Hardenable materials often comprise one or more (meth)acrylate groups.

An "initiator" is a substance being able to start the hardening process of a hardenable material.

A "powder" means a dry, bulk solid composed of a large number of very fine particles that may flow freely when shaken or tilted.

A "particle" means a substance being a solid having a shape which can be geometrically determined. The shape can be regular or irregular. Particles can typically be analysed with respect to e.g. particle size and particle size distribution.

A "surface coated powder" is to be understood as a powder comprising individual particles the surface(s) of which bear(s) a further component being different from the material the particle consists of.

By "machining" is meant milling, grinding, cutting, carving, or shaping a material by a machine. Milling is usually faster and more cost effective than grinding.

"Individualized dental article" shall mean a dental article which relates to a particular individual (e.g. patient). That is, the dental article is not a commodity, but has been produced based on an individual need. An individualized dental article is typically adapted to an individual situation of a patient, e.g. regarding shape and/or colour.

"Data set" shall mean a set of information (especially in a format which is readable by a CAD/CAM device). The data set may include geometry data, colour data, texture data and combinations thereof. The data set may also include descriptive information e.g. patient data and processing parameters.

"Geometry data" shall mean data which contains information (especially in a format which is readable by a CAD/CAM device) about the geometry (e.g., x, y, z coordinates) of a certain part or portion of the dental article to be produced.

"Colour data" shall mean data which contains information (especially in a format which is readable by a CAD/CAM device) about the colour, translucency and/or brilliance of a certain part or portion of the dental article to be produced. This kind of data is sometimes referred to as spectral data.

"Colour" shall comprise colour, brightness and translucency of a material. If desired, a colour can be characterized by its L*a*b* values or by a comparison with a colour code like the VITA 3D™ Master shade guide.

"Consolidate" shall mean a process step which leads to a solidification, hardening or setting of the hardenable material to which the consolidation step has been applied. A consolidation step typically leads to an increase of the hardness and/or strength of the hardenable material.

"Marking element" shall mean an element which is detectable either by a human being or a machine and allows the determination of the orientation or position of the article to which it has been applied. Suitable marking elements include colour codes, bar codes, RFID tags, notches, locating surfaces and combinations thereof.

A composition is "essentially or substantially free of" a certain component within the meaning of the invention, if the composition does not contain said component as an essential feature. Thus, said component is not wilfully added to the composition either as such or in combination with other components or ingredient of other components. A composition being essentially free of a certain component usually contains the component in an amount of less than about 1 wt.-% or less than about 0.1 wt.-% or less than about 0.01 wt.-% with respect to the whole composition. Ideally the composition solution does not contain the said component at all. However, sometimes the presence of a small amount of the said component is not avoidable e.g. due to impurities.

As used herein, "a", "an", "the", "at least one" and "one or more" are used interchangeably. The terms "comprises" or "contains" and variations thereof do not have a limiting meaning where these terms appear in the description and claims. Also herein, the recitations of numerical ranges by endpoints include all numbers subsumed within that range (e.g., 1 to 5 includes 1, 1.5, 2, 2.75, 3, 3.80, 4, 5, etc.).

Unless otherwise indicated, all numbers expressing quantities of ingredients, measurement of properties such as contrast ratio and so forth used in the specification and claims are to be understood as being modified in all instances by the term "about."

DETAILED DESCRIPTION OF THE INVENTION

The invention facilitates the production of individualized dental articles in an easy and efficient way.

Moreover, the process described in the present text allows the production of dental milling blocks containing an individualized, especially individualized coloured dental article.

The individualized colouring of the dental article is already done before the machining of the dental milling block starts.

If desired, the process can also facilitate the simultaneous production of a huge number of individualized dental articles contained in a dental milling block.

Further, if desired, the production of the dental milling block(s) can be done in a dental lab using a rapid-prototyping technique(s), whereas the removal of the surrounding material can be done by the dentist, e.g. using a chair-side mill.

It is also possible to produce a dental milling block containing within one dental milling block a variety of individualized dental restorations (e.g. crowns, bridges, veneers, etc.).

The risk of fractures or damages during the production process of dental articles or restorations is reduced as the dental article or restoration is protected during the transportation or shipping process by the surrounding material. The individualized dental restoration is embedded in the milling block.

It was found that using rapid-prototyping techniques enables the production of dental milling blocks having a sufficient strength to be machined afterwards in order to finally obtain a dental restoration.

A combination of technologies like layer-by-layer build-up for the material, 3D printing for colouring and machining for shaping the dental appliance provides a full digital workflow and enables a cost efficient way to produce high aesthetic individually coloured dental restorations.

Producing the dental milling block containing the dental article by a layer-by-layer technique (especially if consolidation step(s) is(are) included) might also reduce internal stress between the individual layers. This often facilitates the production of larger and more complicated 3-dim structures.

The term "layer" means a flat sheet of a composition having essential a 2dim structure, that is, a thin sheet of material having no convex or concave elements.

The process for producing dental milling blocks and the process of using the milling block for producing individualized dental articles described in the present text can either be run by a dental lab on a large scale or by the practitioner in a so-called chair-side procedure on a small and more individual scale. It is, however, also possible to have the dental milling block and dental articles produced by a central manufacturing unit.

The invention offers the possibility not only to change colour or translucency of the material, but also other properties like, hardness and/or wear resistance.

Each layer of the dental milling block can be individualized by the selective application of a colour agent.

As every pixel can be assigned its individual colour, the production of highly aesthetic dental articles having the natural mimic of a unique tooth can be achieved.

The invention relates to a dental milling block comprising a dental article having an outer surface. The dental article has been produced or is based on personalized data. That is, the dental article has been designed for a particular patient and thus can also be referred to as individualized dental article.

Personalized data may comprise geometry data, colour data or a combination thereof.

The outer surface of the dental article is at least partially or fully covered with a surrounding material. The surrounding material typically comprises or consists essentially of or consists of the same material the dental article is made of, but has typically a different colour or colour shading.

"At least partially covered" means that at least about 70, 80, 90, 95, 99 or 100% of the surface of the dental article are surrounded by the surrounding material.

The surrounding material is to be removed later during the production process of the dental article (e.g. by a machining process) and thus is finally not part of the dental article.

The dental article may have the shape of a crown, bridge, veneer, implant, abutment, root-pin, orthodontic bracket, dental support structure, inlay, onlay, drilling template, full arch prostheses or part thereof.

Besides an outer surface, the dental article has typically also an inner surface. The inner surface may fit to the surface of a tooth stump to which the dental article is fixed later. The outer surface has usually a convex shape, whereas the inner surface has usually a concave shape.

The dental milling block (comprising an individualized dental article) has been made of a hardenable material, which has been hardened during the production process (e.g. by applying a consolidation step).

The chemical nature of the hardenable material is not particularly limited as long as it can be hardened.

Suitable materials which can be hardened include especially composite materials.

If the dental milling block is produced by using a composite material, the milling block is often referred to as composite dental milling block (CMB).

Composite materials are typically based on (meth)acrylate or epoxy chemistry. Besides hardenable components (i.a. components containing hardenable or curable moieties including acrylate, methacrylate, epoxy moieties), the materials typically also contain an initiator or catalyst being able to initiate or catalyse the curing reaction of these components.

The dental milling block typically has the dimensions $x2$, $y2$ and $z2$. That is, the milling block has a geometrically defined shape.

The following shapes were found to be useful: cubic, cuboid, cylindric or combinations thereof.

The size of the milling block typically depends on the kind of and the number of dental restorations which should be contained therein.

If the milling block is a cuboid and contains only one dental restoration, the size of the milling block is typically as follows: $x2$: from about 1 to about 2.5 cm; $y2$: from about 1 to about 2.5 cm; $z2$: from about 1 to about 2.5 cm.

If the milling block has a cylindric shape and contains only one dental restoration, the size of the milling block is typically as follows: $z2$: from about 1 to about 2.5 cm; diameter (corresponding to $x2$ or $x2$): from about 1 to about 2.5 cm.

If the milling block has a cuboid or cylindric shape and contains more than one dental restorations, the size of the milling block is typically as follows: $x2$: from about 4 to about 6.5 cm; $y2$: from about 1.5 to about 4 cm; $z2$: from about 1.5 to about 4 cm.

The milling block contains at least one individualized dental article. However, it is also possible that the milling block contains more than one, e.g. 2, 3, 4, 5, 6, 7, 8, 9 or 10, 20, 30, 40, 50 individualized dental articles.

Thus, the dental milling block can comprise a couple of individualized dental articles, wherein each dental article is surrounded, covered or protected by a surrounding material.

If the milling block has the shape of a flat cylinder (often referred to as "ronde", "disc" or "puck" in the dental area) about 2 to about 30 individualized dental restorations can be contained.

The dental milling block described in the present text can typically be characterized by at least one of the following features:

Volume: from about 1 to about 350 or from about 20 to about 250 cm$^3$,

Length: from about 1 to about 11 or from about 2 to about 10 cm,

Width: from about 1 to about 11 or from about 2 to about 10 cm,

Height: from about 1 to about 4 or from about 1.4 to about 3.5 cm,

Flexural strength (for dental milling blocks made of composite materials): from about 80 MPa to about 200 MPa (according to ISO 4049)

Raw breaking resistance (for dental milling blocks made of ceramic materials): from about 100 MPa to about 5,000 MPa (according to ISO 6872)

Shape: cube, cuboid or cylinder.

The raw breaking resistance should be sufficient in order to be machined by a commercially available machining device.

If desired, the dental milling block can be attached to a holding device. This typically facilitates a later machining step. A holding device may also facilitate the localisation of the dental milling block and/or dental article during a machining step.

The blank is typically contained in a holding device like a frame or fixed on a stub.

Holding devices including frames have been proven to be useful. Sometimes it can be desirable, if the blank is put in a magazine, either for storing or for machining The holding device may facilitate the machining of the dental article, e.g. by a machining device such as a milling device. Examples of holding devices are shown in US 2003/0132539, U.S. Pat. No. 6,769,912 and EP 0 455 854 B1. The content of these documents with regard to holding devices (e.g. frames and stubs or supporting body) is herewith incorporated by reference and regarded part of the text of the present invention.

Fixing of the dental milling block on a stub can be achieved e.g. by gluing. The fixing should be such that the dental milling block can be processed in a milling machine.

The holding device can be attached to the already produced milling block or the milling block can be produced with a holding device already being inserted or being present during the production process.

Besides gluing other means for attaching the holding device include bonding, screwing, and combinations thereof.

Thus, according to a further embodiment, a process of producing the dental milling block can also comprise the step of combining the milling block with a holding device.

Besides attaching a holding device to the dental milling block, it is also possible to produce the holding device out of the same material the milling block is made of. This can e.g. be done also simultaneously during the production process.

So, the invention is also directed to the dental milling block being contained in or on a holding device.

According to a further embodiment, the dental milling block may also comprise a marking element which allows the determination of the orientation or position of the dental milling block in the surroundings.

A marking element may also facilitate the tracking, monitoring and/or identifying of the dental milling block or dental article during the production process and further use thereof.

Once the dental milling block comprising the individualized dental article is produced it can be difficult to determine in which direction the dental milling block should be machined. So, marking the milling block accordingly can be beneficial especially for machining purposes. Additionally the marking element could include information regarding milling parameters, further processing information like shrinkage parameters, colour, patient data or the like.

Any marking element fulfilling this function can be used.

Suitable marking elements include colour codes, bar codes, RFID tags, notches, locating surfaces and combinations thereof.

The marking element can be incorporated into or onto the milling block during its production. If the milling block comprises a holding device, the marking element can also be present on the holding device.

Thus, the dental milling block can be characterized by at least one of the following features:
- comprising a marking element,
- having the shape of a cube, cuboid or cylinder,
- comprising a hardened material like a hardened or solidified composite material,
- having a volume from about 1 to about 350 cm$^3$.

The process of producing a dental milling block according to the invention comprises a couple of individual steps.

According to one embodiment, a suitable process of producing a dental milling block as described in the present text comprises the steps of
- providing a personalized Data Set C containing geometry data of the dental article and colour data related to said geometry data,
- generating a layer of hardenable material on a surface,
- applying a colour agent to the layer of hardenable material of the previous step, wherein the colour agent is applied to at least some regions of those areas of the layer of hardenable material which are related to the geometry data of the dental article,
- consolidating the result obtained in step c) thereby obtaining an at least partially hardened layer of material.

The process comprises the step:
Provide a personalized Data Set C containing geometry data of at least one dental article and colour data related to said geometry data.

Thus, Data Set C contains two kinds of information: geometry data of a dental article and colour data related to the geometry data.

"Contain" means that the geometry data and the colour data are mathematically linked to each other. The data should be in a format to be read and interpreted by the processing software of a rapid-prototyping device.

The geometry data contains information about the geometry of the dental article, including the shape and size of the outer surface and the shape and size of the inner surface.

Means for obtaining geometry data are known to the practitioner. The geometry data can be obtained e.g. by using an intraoral scanner (e.g. LAVA™ COS from 3M ESPE) or by digitizing a master model e.g. by using a lab scanner (e.g. LAVA™ Scan ST from 3M ESPE) or by constructing the dental restoration with a computer software, or by using data obtained from scanning a classic impression of the dental situation.

A typical data format for this kind of data is the STL format.

Thus, Data Set C can be generated out of a Data Set A comprising geometry data of the dental article and a Data Set B comprising colour data of the dental article.

The colour data is related to the geometry data. "Related" means that to a certain geometry data point a certain colour can or has been assigned.

The colour data is typically generated or obtained independently from the geometric data.

Suitable means for obtaining colour data are i.a. described in U.S. Pat. No. 5,759,030 (Jung et al.) or U.S. Pat. No. 7,086,863 (Van der Zel). If desired, other means can be used.

A further means for creating a Data Set C is described in EP 11195192 (filed Dec. 22, 2011). The method described in EP 11195192 comprises the steps of providing a computer model of a 3-dim reference surface that is based on a shape of at least one of: a) a tooth structure of a tooth to be restored and b) a dental restauration for a tooth, visualizing the 3-dim reference surface, providing a user-operable virtual material deposition tool, using the virtual material deposition tool to deposit a plurality of computer simulated layers relative to the reference surface; and assigning at least two of the plurality of computer simulated layers different tooth colours.

The inventive process further comprises the step:
Generate a layer of hardenable material on a surface.

The layer of material may have the dimensions x1, y1 and z1, x1 and y1 being equal to or greater than x2 and y2, z1 being smaller than z2, with x2, y2 and z2 being the dimensions of the dental milling block.

The layer can be generated by typical measures known to the practitioner being familiar with rapid-prototyping techniques. Those measures include coating, raking, sieve dipping, printing, spraying, sprinkling and combinations thereof.

If the hardenable material is in a highly viscous or paste form, heat can be applied, if desired, in order to reduce the viscosity of the hardenable material.

As an example, the hardenable material can be coated on a surface using a blade. The thinner the thickness of the layer is, the more accurate the final dental restoration typically becomes.

The thickness of the layer (z1-direction) is usually within a range from about 0.001 mm to about 3 mm or from about 0.005 mm to about 0.5 mm.

The material can be applied in any desired shape, including the shape of a square, rectangle, circle or oval.

The respective dimensions for the value x1 and/or y1 are typically from about 10 mm to about 1,000 mm or from about 10 mm to about 200 mm.

The respective dimensions for the value z1 are typically from about 0.01 mm to about 0.5 mm or from about 0.05 mm to about 0.2 mm.

If the shape of the layer is different from a square or rectangle, the respective x1 and y1 values refer to the largest distance in the x1 or y1 direction. For a circle, x1 and y1 are identical and correspond to the diameter.

The first layer of the hardenable material is typically applied to the surface of a movable piston. The second and further layers of hardenable material are applied on the surface of the previous layer.

If desired and/or if no colour agent should be applied to a particular layer, the layer is typically consolidated afterwards.

"Consolidation" means that the hardenable material is at least partially solidified. Depending on the chemical nature of the hardenable material used, different means for consolidations can be used.

Useful consolidation methods include radiation-curing (e.g. wavelength from about 300 to about 550 nm), heat-curing (e.g. temperature from about 60 to about 150° C.), self-curing (e.g. if a redox system is present in the hardenable material) and electron beam curing.

The consolidation step is conducted for a sufficient period of time in order to place the layer in a condition that a further layer can be placed on top. A consolidation step typically is conducted within a time frame from about 0.01 to about 300 s.

Once the layer of hardenable material has been consolidated, the strength is typically increased.

Depending on the nature of the hardenable material chosen, it is sometimes advantageous to further modify the geometry data related to the dental article. If, e.g. the hardenable material will shrink during the production step of the dental article, the geometry data relating to the dental article should be proportionally enlarged.

The term "proportionally enlarged" means that each of the three dimensions of an enlarged object is enlarged relative to the corresponding dimension of the original object by preferably substantially the same magnification factor. Further, "proportionally enlarged" may include tolerances of the magnification factor in each dimension so that each of the three dimensions of the enlarged object may be enlarged relative to the corresponding dimension of the original object by three individual magnification factors with at least two of the individual magnification factors being different from each other by about 1% to about 5%.

In a further step a colour agent is applied. To at least a part of those regions which pertain to the dental article, ideally the regions which are finally visible in the patient's mouth, a colour agent is applied.

Thus, the process further comprises the step:
Apply one or more colour agents to the layer of hardenable material, wherein the colour agent(s) is(are) applied to at least some regions (e.g. at least about 1 or at least about 5 or at least about 10 or at least about 20 or at least about 50%, but less than about 95 or less than about 90 or less than about 80%) of those areas of the layer of hardenable material which are related to the geometry data of the dental article.

That is, the colour agent is not applied to the whole surface of the layer of hardenable material but only to a part thereof.

The colour agent is applied in a separate step and not together with the hardenable material.

The colour agent can be applied to only some regions of those areas which relate to the dental article or to all regions of those areas which relate to the dental article.

That is, the inventive process facilitates the colouring of individual pixels pertaining to the dental article.

Thus, the process of the invention is not related to a process of producing a multi-coloured shaped dental milling block containing a couple of fully coloured standardized layers.

The colour agent is typically applied to the hardenable material before a consolidation step is carried out. However, it is also possible that the colour agent is applied to only a partially consolidated layer of material.

The colour agent is typically applied in a liquid or low viscous form.

The colour agent is typically provided in a form which makes it possible to apply it using commercially available rapid-prototyping equipment including ink-jet printers.

Colour agents are applied only to those areas or regions of the layer of hardenable material which are related to the geometry of the dental restoration.

The other areas or regions of the layer of hardenable material (i.e. surrounding material) are typically not treated with a colour agent. This may help to save costs and speed up the production process.

Treating those areas which are not related to the dental article with a colouring agent is also not necessary, as those areas are removed later during a machining step.

Thus, the invention allows the selective colouring of individual regions or spots of the dental article before a machining and/or heating step is conducted.

The respective geometry information needed for selectively applying the colour agent is typically contained in or related to Data Set C.

The colour agent is typically applied together with a liquid or in liquid form.

The nature of the liquid which can be used in the rapid-prototyping technique is not particularly limited, unless the intended purpose cannot be achieved.

Suitable liquids can be characterized by at least one of the following features:
boiling point: about 60 to about 120° C.,
freezing point: about −120 to about 0° C.,
density: about 0.7 to about 1.2 g/cm3,
pH-value (if mixed with water): from about 1 to about 14 or from about 2 to about 8.

Specific examples of liquids which can be used include water, alcohols (including methanol, ethanol, n- and iso-propanol), ketons (including acetone) and mixtures thereof.

If desired, the liquid can comprise one or more colourants. The colourant can be a solid (e.g. pigment) or a soluble substance. Suitable colourants include solutions or dispersions of inorganic or organic ions or molecules or inorganic or organic pigments or particles, mixtures and combinations thereof, colourants in the form of aerosols/solutions of colourants which are sprayed over the layer with the solvent evaporating during the spraying step but also substances which are able to form coloured components when a consolidation step is applied.

After the application of a colour agent, a consolidation step is typically conducted in order to fix the applied colour in the layer of the hardenable material.

The result obtained after the consolidation step is an at least partially hardened layer of material having the dimensions x1, y1 and z1.

Besides from the steps described above one or more of the following steps or sequences of steps can be conducted, if desired:
- generate first a (protection) layer A of hardenable material and apply a consolidation step,
- generate a final (protection) layer Z of hardenable material and apply a consolidation step.

The first and final layers typically function as protection layers covering the upper and lower part of the individualized dental article.

Whether all steps are conducted or not, is typically depending on the status of the production of the dental milling block.

In an early status (e.g. when the first layer(s) of the dental milling block are generated), typically no colour agent is applied. In the status where the regions pertaining to the dental article are generated, the colour agent is applied, especially as regards those regions which are finally visible in the patient's mouth.

Thus, the consolidation step can be conducted either with respect to a non-coloured layer or with respect to a layer to which a colour agent has been applied.

The invention is also directed to a dental milling block obtainable by the process described in the present text.

The invention is also directed to a process of producing an individualized dental article. This process comprises the steps of
- provide a dental milling block as described in the present text and
- machine the dental milling block using at least parts of the geometry data contained in Data Set C, thereby removing essentially all of the surrounding material e.g. until the dental article contained in the dental milling block becomes visible or is obtained.

The step of machining comprises procedures including milling, grinding, and combinations thereof.

During the machining step the material surrounding the dental article is removed. As a result, an individualized dental article is obtained. The term "individualized dental article" does typically not only include the shape but also the colour.

The machining step can be characterized by at least one of the following features:
- machining can be accomplished by either grinding or milling or a combination of both,
- machining can be accomplished under dry or wet conditions,
- milling parameter rotation: about 18,000 to about 32,000 rpm, and/or
- milling parameter motion: about 1,500 to about 2,500 mm per min.

Devices which can be used include CEREC™ milling machine(s) (Sirona Dental Systems) or LAVA™ milling machine(s) (3M ESPE AG) or any other computer aided device for milling or shaping prosthetic dental devices.

During the machining step, the hardened material surrounding or covering the individualized dental article being contained in the dental milling block is removed. As a result an individualized dental article is obtained.

If desired, a finishing step and/or polishing step can be conducted in order to smoothen the surface (e.g. to remove sprues and milling tracks) and/or to increase the aesthetics.

According to one embodiment, the process for producing the dental mill blank does typically not comprise process steps where completely coloured layers of hardenable material are produced which pertain to the dental article contained in the dental mill blank.

According to another embodiment, the process for producing the dental mill blank does typically not comprise the step of rotating the dental milling block and/or a step of spray deposition a deposition material.

In FIG. 1 a cube shaped dental milling block (1) is shown containing an individualized dental article in the shape of an individualized dental restauration (2). For better visibility the dental milling block is shown in a transparent view. The dental milling block containing the individualized dental article has been produced with a rapid-prototyping technique using personalized data and contains individualized coloured sections. The individualized dental article is surrounded by a surrounding material.

Figure 2:
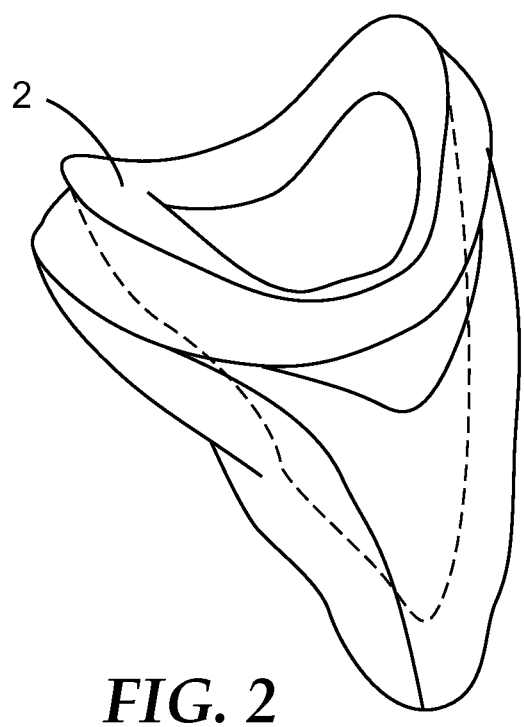
FIG. 2 shows a dental article obtained from the mill block after having removed the surrounding material.

In FIG. 2 a dental article in the shape of an individualized dental restauration (2) milled out of the dental milling block is shown. The material surrounding the individualized dental article has been removed e.g. by grinding or milling. The visible outer surface of the dental article is typically coloured.

Figure 3:
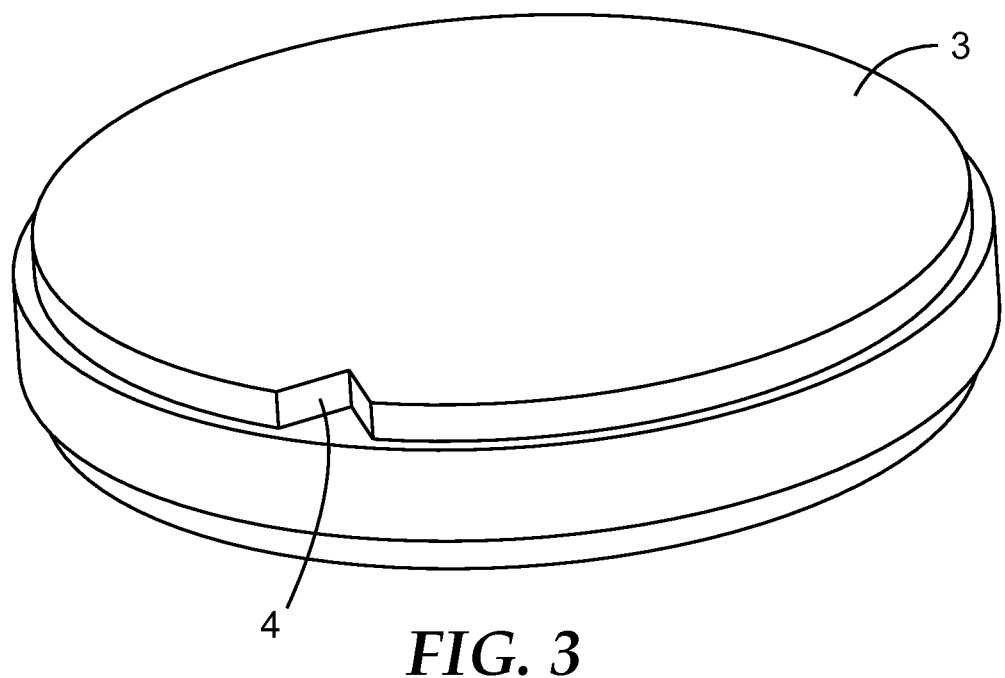
FIG. 3 shows a disc shaped dental milling block.

FIG. 3 shows a disc shaped dental milling block (3) with a marking element (4) on the upper side (incision). The marking element (4) may help localizing the orientation or position of the dental milling block in the surroundings (e.g. identifying the upper and lower side).

Figure 4:
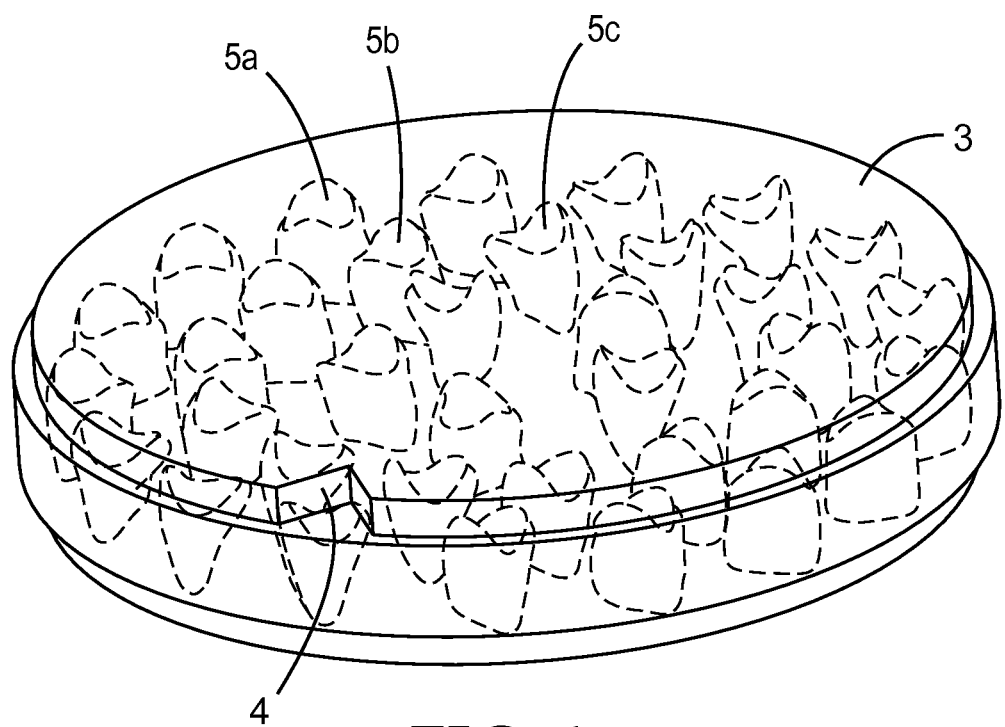
FIG. 4 shows a transparent view of the dental milling block.

FIG. 4 shows a transparent view of the dental milling block (3) of FIG. 2 containing a variety of dental articles in the shape of individualized dental restaurations (5a, 5b, 5c, etc.). A disc shaped dental milling block may contain e.g. 10 to 30 individualized dental articles (e.g. dental restaurations in the shape of a crown, wherein each dental restauration is individualized with respect to shape and colour).

Dental articles which can be produced with the process(es) described in the present text include dental restorations, dental support structures (sometimes also referred to as dental copings), dental veneers (sometimes also referred to as dental facings), inlays, onlays, orthodontic brackets, implants, abutments, root pins, crowns, bridges, drilling template, prostheses and parts thereof.

The invention claimed is:

1. A process of producing a dental milling block layer-by-layer, the dental milling block having the shape of a cube, cuboid, or cylinder and comprising a dental article having an outer surface, the dental article being based on personalized data, the personalized data comprising colour data, wherein the outer surface of the dental article is at least partially covered or surrounded with a surrounding material, the surrounding material not being part of the dental article, the surrounding material comprising the same material the dental article is made of but having a different colour the process comprising the steps of:
a) providing a personalized Data Set C containing geometry data of the dental article and colour data related to said geometry data
b) generating a layer of hardenable material on a surface, c) applying a colour agent to the layer of hardenable material of step b), wherein the colour agent is applied to at least some regions of those areas of the layer of hardenable material which are related to the geometry data of the dental article, d) consolidating the result obtained in step c) thereby obtaining an at least partially hardened layer of material.

2. The process according to claim 1, Data Set C being generated out of a Data Set A comprising geometry data of the dental article and a Data Set B comprising colour data of the dental article.

3. The process according to claim 2, the colour agent being applied using techniques comprising ink-jet printing, 3d-printing, multijet plotting, robo-casting, electrophoretic deposition, fused deposition modelling, laminated object manufacturing, selective laser sintering or melting, stereolithography, photostereolithography, or combinations thereof.

4. The process according to claim 1, the hardenable material comprising a composite material.

5. The process according to claim 1, the layer of step b) being generated using techniques comprising coating, raking, sieve dipping, printing, spraying, sprinkling and combinations thereof.

6. The process according to claim 1, the consolidation step of step d) comprising techniques comprising radiation curing, heating, self-curing, applying a bonding agent and combinations thereof.

7. The process according to claim 1 further comprising the steps:

a) provide a dental milling block according to a process described in claim 1, b) machining the dental milling block using at least parts of the geometry data contained in Data Set C, thereby removing a surrounding material of the dental milling block to obtain a personalized coloured dental article.

8. The process according to claim 1, wherein the Data Set C being generated out of a Data Set A comprising geometry data of the dental article and a Data Set B comprising colour data of the dental article, is designed for a particular patient.

* * * * *